Jan. 30, 1968            P. E. RICHTER            3,366,012

MACHINE TOOL GUARD STRUCTURE

Filed May 31, 1966            2 Sheets-Sheet 1

INVENTOR.
Paul E. Richter

BY
Howard S. Keiser
& Jack J. Earl
ATTORNEYS

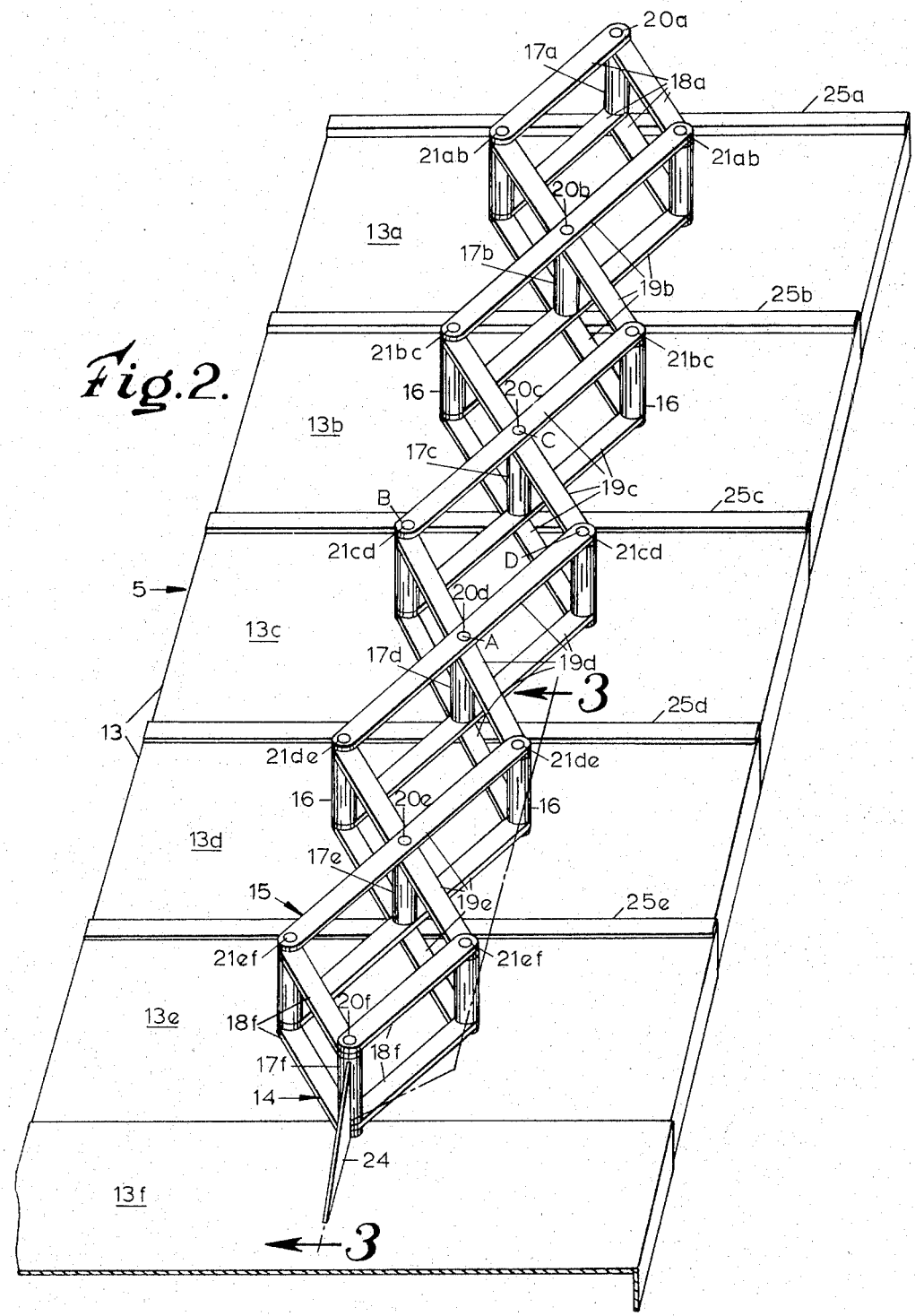

United States Patent Office 3,366,012
Patented Jan. 30, 1968

3,366,012
MACHINE TOOL GUARD STRUCTURE
Paul E. Richter, Cincinnati, Ohio, assignor to The Cincinnati Milling Machine Co., Cincinnati, Ohio, a corporation of Ohio
Filed May 31, 1966, Ser. No. 554,013
5 Claims. (Cl. 90—11)

The present invention relates to machine tools and more particularly to a rigid extensible structure adapted for a bridging connection between two relatively movable members to function as a splash guard and a chip retainer during use of the machine.

It is an object of this invention to provide a self-supporting and telescoping bridging structure between a fixed machine base and a spindle carrier movable in two coordinate directions to maintain a substantial surface below a machining operation for the purpose of catching cutting fluid and swarf discharged during a cutting operation.

It is a further object to provide a machine guard structure which is both extensible and angularly adjustable simultaneously in a space between two relatively movable members to which the structure is connected only at its ends.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In its preferred form the present invention is a longitudinally expanding and contracting guard structure having external support only at its ends. A substantial surface area is provided to act as a guard or trough. This surface area is formed of relatively light gage metal and is attached to an expandable truss structure which provides the necessary rigidity to the complete assembly so that it will support itself and an external load without sag or buckling as it is extended or contracted. Preferably the structure is connected at its ends by hinges to the units between which it forms a bridge so that its angular orientation can change simultaneously with its length.

A clear understanding of the invention can be obtained from the following detailed description in which reference is made to the accompanying drawings in which:

FIG. 2 is a perspective view of the underside of the extensible structure.

Figure 1:
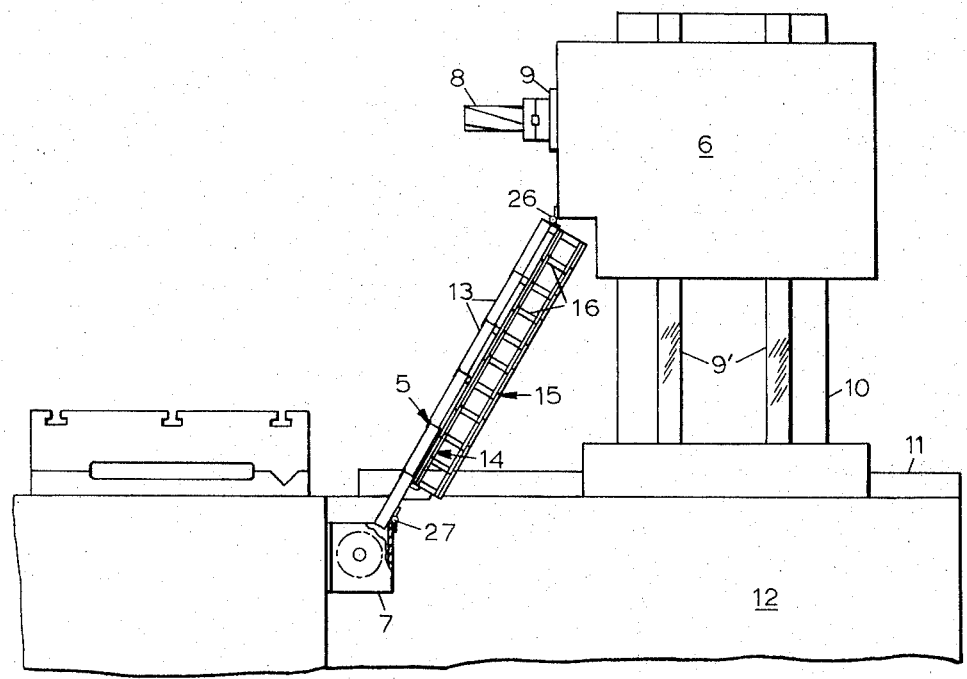
FIG. 1 is a side elevational view of the device of this invention mounted on a conventional milling machine.

The extensible structure 5 of this invention is shown as an easily detachable unit in FIG. 1 hingedly connected at one end to a spindle carrier 6 and at the other end to a chip and coolant collector 7 of a milling machine so that the structure 5 can change its angular relationship with both the carrier 6 and collector 7. The structure 5 is intended to collect cutting fluid and chips which fall from a cutting tool 8 held in a spindle 9 in the carrier 6. The carrier 6 is movable both vertically and horizontally. Vertical movement is provided by movement of the carrier 6 along the ways 9′ of a column 10. The column 10 is movable along horizontal ways 11 on the stem portion of a T-shaped machine bed 12.

In the embodiment shown specifically herein the extensible structure 5 comprises a series of members shaped to form short troughs 13a through 13f held in telescoping relationship by a pair of pantographic structures 14, 15 formed by a series of diamond or rhombic shaped structures with hinged or pivotal corners and with adjacent diamonds having a common point of pivot at one corner of each. Each of these rhombic frames is variable in shape by the application of forces to the ends of the structures acting in a direction parallel to planes of these frames, that is in the direction of the length of the structures. Each of the troughs 13 is formed of relatively thin sheet metal and has a substantial surface area to provide a wide area below the cutter 8 to catch chips and cutting fluid. The structures 14, 15 are joined one to the other and to the troughs 13 by studs 16 and 17a through 17f, thus forming a longitudinally extensible truss unit having sufficient rigidity in a vertical plane to reduce chambering or bending which would otherwise result when the structure is caused to extend and contract by the application of forces to its ends only. To permit the sliding overlapping movement of the troughs 13, they are each attached to the upper pantographic structure of the truss assembly 5 at only one point. The trough sections 13a through 13e are attached to respective ones of the rhombic frames of the truss assembly along its length and the terminal trough 13f is rigidly attached at the extreme end of the assembly at the stud 17f so that the movements of the troughs 13a through 13e are all with respect to the trough 13f.

Figure 4:
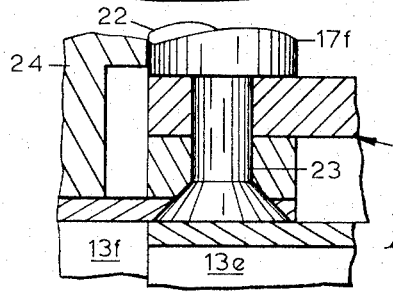
FIG. 4 is a sectional view showing a portion of the structure in FIG. 3 enlarged to clearly show the detail thereof.
Figure 3:
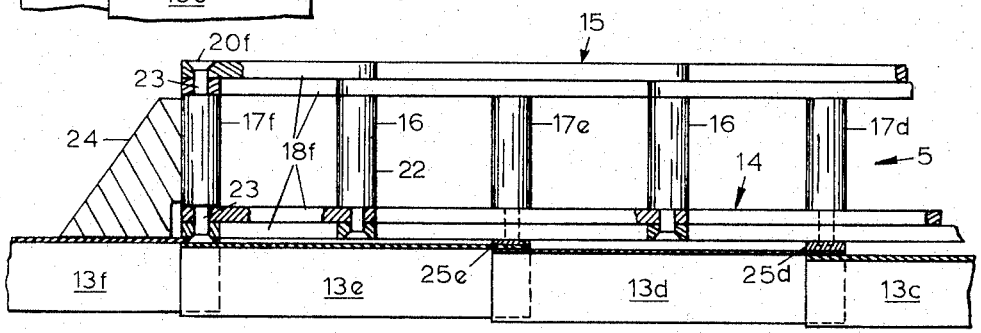
FIG. 3 is a sectional view taken on line 3—3 of FIG. 2.

FIG. 2 shows the general arrangement of the various parts mentioned hereinabove and FIGS. 3 and 4 show the specific method of riveting the pantographic structures 14, 15 to the studs 16, 17a through 17f and the troughs 13a through 13f. As shown in FIG. 2 the pantographic structures 14 and 15 comprise a plurality of links 18a, 19b, 19c, 19d, 19e and 18f so arranged according to known mechanical principles as to form a series of interconnected rhombuses such as indicated in FIG. 2 by the letters A, B, C, D, A.

The links 18a are pivotally joined at their end points 20a to the stud 17a carried by the trough 12a. The links 19b, 19c, 19d, 19e are pivotally joined at their midpoints 20b through 20e to the corresponding studs 17b, 17c, 17d, 17e carried by the corresponding troughs 13b, 13c, 13d, 13e. In a like manner the links 18f and the stud 17f are carried by the trough 13f. The links 18a, 19b, 19c, 19d, 19e, and 18f are pivotally joined at their corresponding end points 21ab, 21bc, 21cd, 21de and 21ef to the studs 16.

As shown in FIGS. 3 and 4 the studs 16 and 17a through 17f have a spacer member 22 with an integral pin 23 extending from each end. The members 22 serve to maintain the pantographs 14, 15 and the troughs 13a through 13f in spaced parallel relationship when joined in place by spreading the ends of the pins 23 to form heads thereon as shown to function as rivets. The rhombic frames of the pantographic assemblies together with the studs 16 and 17a through 17f form a chain of rhombic frameworks and one of the troughs 13a through 13f is connected at one point to a respective stud 17a through 17f. For additional rigidity a gusset plate 24 is welded between the trough 13f and the stud 17f and also stiffening and spacing strips 25a through 25e are spot welded to the respective troughs 13a through 13e. These strips vary in thickness in order to maintain the troughs 13 parallel to one another and to the pantographs 14, 15. For example, the strip 25e is the thickness of the trough 13f; the strip 25b is the thickness of the trough 13f plus 13e and so on. This eliminates excessive drag of the troughs 13a through 13f on one another and prevents binding of the pantographic truss structure as it is longitudinally expanded and contracted since all of the spacers 16 will be held in a parallel relationship one to another as will the troughs 13. It can be seen from the preceding description that all of the sides of the rhombuses A, B, C, D, A formed by the links 18 and 19 are equal. Diagonals such as from the point 20a to the point 20b in each of the rhombuses will be equal and consequently the troughs 13 will be equally spaced thus rendering an equal distribution of the weight of the extensible structure.

The uppermost end of the structure 5 is connected to the carrier 6 by means of a hinge 26 that is fastened in place between the carrier 6 and the strip 25a of the trough 13a. The lower end of the structure 5 is connected by means of a hinge 27 that is received between the side of the collector 7 and the lower side of the trough 13f (see FIG. 1). Therefore, as the carrier 6 is moved in the coordinate directions vertically and horizontally, the structure 5 is permitted to freely change its angular orientation as well as its length so that it is always in place below the cutter 8.

What is claimed is:
1. In a machine tool having two structural members relatively movable in coordinate directions, a guard assembly extending between the two structural members comprising in combination:
  (a) a series of guard members each having a substantial surface area adapted to slidably overlap with the next adjacent guard members,
  (b) a longitudinally expansible and contractable truss formed of a chain of frameworks, each framework connected to a respective one of said guard members at one point and having a shape in one plane variable upon the application of a force parallel to that plane, and
  (c) a hinge on each of the guard members at the opposite ends of said series, one and the other of said hinges attached to one and the other of said structural members.
2. The machine tool apparatus of claim 1 wherein:
  (a) said truss includes a pair of spaced pantographic assemblies and
  (b) each of said frameworks is comprised of component members joined to form rhombuses each having pivotal corner connections, one pivotal corner connection being common to adjacent frameworks.
3. The machine tool apparatus of claim 1 wherein:
  (a) means are provided for spacing said guard members progressively from the respective frameworks of said truss at the points of connection thereto to hold the guard members parallel with one another and with the longitudinal direction of said truss.
4. The machine tool apparatus of claim 3 wherein:
  (a) said means is a series of spacer strips each extending across one end of a guard member in the direction transverse to the longitudinal dimension of said truss, the spacer strips of adjacent guard members having a thickness difference from one to the next equal to the thickness of one of said guard members.
5. The machine tool apparatus of claim 4 wherein said truss includes:
  (a) first and second pantographic assemblies each including a plurality of components connected together to form a chain of rhombic frames,
  (b) means for holding said pantographic assemblies rigidly parallel one with the other,
  (c) means for connecting the first of said guard members rigidly to one corner of one of said rhombic frames at the extreme end of one of said pantographic assemblies, and
  (d) means for connecting the others of said guard members each at one point and in an overlapping series from said first guard member along said one pantographic assembly.

References Cited

FOREIGN PATENTS 954,304 12/1956 Germany.
957,710 2/1957 Germany.

LEONIDAS VLACHOS, *Primary Examiner.*